Sept. 14, 1965  A. FRIEDMAN  3,206,755
MICRO-CAPSULE METHOD AND APPARATUS
Filed Dec. 20, 1963
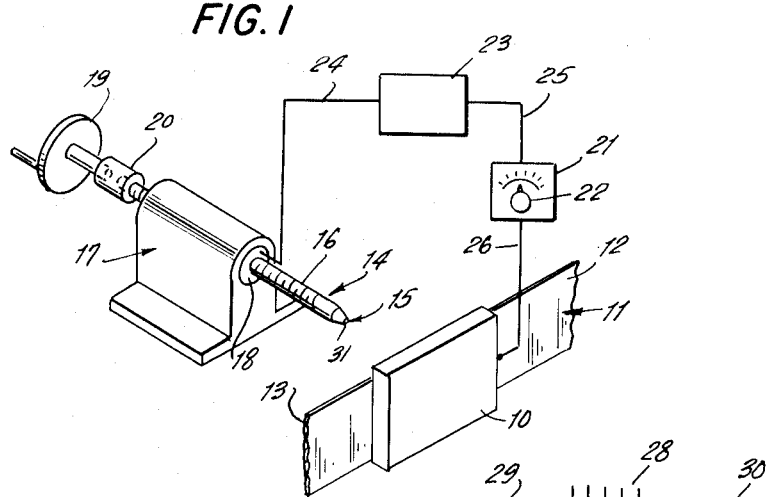
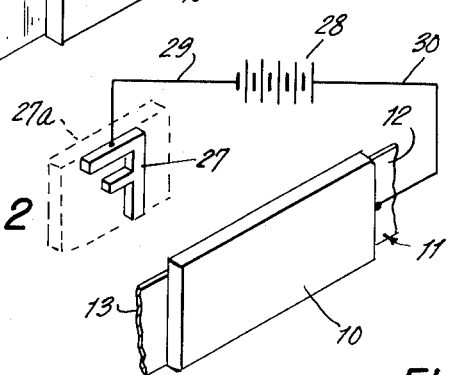
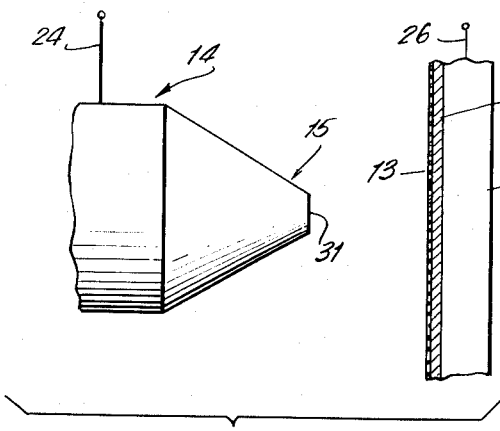
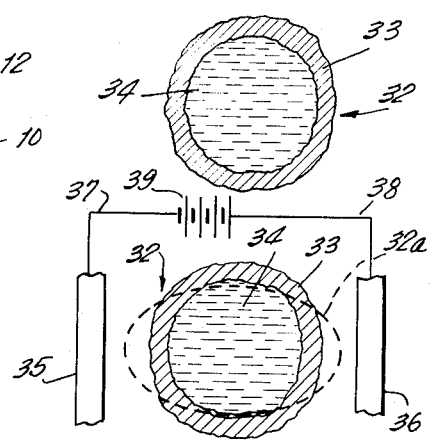
INVENTOR.
ABRAHAM FRIEDMAN
BY
Friedman & Goodman
ATTORNEYS 3,206,755
MICRO-CAPSULE METHOD AND APPARATUS
Abraham Friedman, 288 Bay 38th St., Brooklyn, N.Y.
Filed Dec. 20, 1963, Ser. No. 332,117
9 Claims. (Cl. 346—1)

This invention relates to a method of exposing the contents of micro-capsular material and, more particularly, to a method of rupturing the mantle of a micro-capsule by the application of an electrostatic field in order to produce indicia or for other purposes.

The term "micro-capsule" as herein employed is intended to designate a minute or microscropic capsule wherein a nucleous or microscropic drop of liquid material is surrounded by a mantle of relatively impervious material. The mantle is relatively thin and pressure rupturable. Micro-capsules of the type to which reference is here made have formed by coacervation as well as by methods involving interfacial polycondensation. Reference in this connection is made to the following United States Letters Patent.

| Re. 24,899 | Nov. 29, 1960 | B. K. Green |
| 2,299,693 | Oct. 20, 1942 | B. K. Green |
| 2,374,862 | May 1, 1945 | B. K. Green |
| 2,730,456 | Jan. 10, 1956 | B. K. Green et al. |
| 2,730,457 | Jan. 10, 1956 | B. K. Green et al. |
| 2,800,457 | July 23, 1957 | B. K. Green et al |
| 2,800,458 | July 23, 1957 | B. K. Green |
| 2,953,470 | Sept. 20, 1960 | B. K. Green et al. |
| 2,971,916 | Feb. 14, 1961 | L. Schleicher et al. |
| 2,988,461 | June 13, 1961 | H. J. Eichel |
| 3,016,308 | Jan. 9, 1962 | N. Macaulay |
| 3,069,370 | Dec. 18, 1962 | E. H. Jensen et al. |

A description of the interfacial polycondensation method is found in abandoned United States patent application Serial No. 813,425 and in SPE Transactions of January 1963, at page 71.

The profusion of pressure rupturable liquid containing capsules formed by means of the foregoing methods, has a wide variety of applications. A principal application has been as a coating upon a substratum to produce pressure responsive record or transfer materials. In such cases the coating of micro-capsular material is subjected to mechanical impact or pressure, whereby the capsule mantle or wall is broken or ruptured. The capsule contents are thus exposed and released. In some cases the exposed material is reactive with the atmosphere to produce visible markings or indicia while in other applications the exposed or released material is brought into contact with additional reactive substances for similar purposes. Exposure or release of the encapsulated material may be desired for transfer contact as well as a variety of other uses. The requirement of the application of mechanical impact or pressure in order to rupture the capsule wall has constituted a limitation upon the utilization of this material.

It is an object of this invention to provide a method for exposing or releasing the contents of micro-capsular material by means of the application of an electrostatic field in the region of said capsule of sufficient intensity to cause the capsule wall to be ruptured.

Other and further objects and benefits of this invention will appear from specification, claims, and the accompanying drawings, wherein:

FIGURE 1 is a diagrammatic view of one form of apparatus for carrying out the method of the present invention;

FIGURE 2 is a diagrammatic view of another form of apparatus therefor;

FIGURE 3 is a fragmentary view of the apparatus shown in FIGURE 1, partly in section and on an enlarged scale;

FIGURE 4 is a diagrammatic view of a cross-section of an individual capsule; and FIGURE 5 is a diagrammatic view indicating a capsule in the process of being subjected to an electrostatic field.

In FIGURES 1, 2 and 3 there is shown a form of apparatus whereby the instant invention may be practiced. In its principal features, the apparatus comprises a base electrode designated by the numeral 10 against which a record sheet designated generally by the numeral 11 is disposed. The record sheet may if desired be advantageously mounted for transport across the face of electrode 10 by conventional means, not shown. The sheet of record material 11 is provided with a layer of liquid containing micro-capsular material as described in the aforementioned patents, the contents of which it is desired to expose or release. The capsular material may be disposed upon a surface of the base sheet 12 in the form of a coating 13, the base sheet, such as paper, comprising a supporting therefor. The capsular material may be incorporated in a support material or matrix.

A complementary electrode 14 which is advantageously provided with a conical head 15 and a screw-threaded body 16 is disposed in juxtaposition with the sheet of record material 11. The electrodes are formed of an electro-conductive material. Electrode 14 is carried by a suitable support comprising a housing 17 of an insulating material. The housing 17 is provided with a bore within which a sleeve 18 of conductive material is disposed. Sleeve 18 is provided with an internally threaded bore within which the threaded electrode 14 is received. The distal end of electrode 14 carries a crankwheel 19 which is interconnected therewith by means of insulating sleeve 20. It will be apparent that the arrangement electrically isolates the electrode while permitting the adjustment of its position with respect to the recording medium 11 by means of the operation of the handcrank.

A unidirectional high voltage electrostatic field is established between the electrodes 10 and 14, and the intervening microcapsules by means of a source designated by the numeral 21 which is provided with means 22 for adjusting the field intensity. There may also be provided a control means 23 for controlling or interrupting the field as and when desired. Conductors 24, 25 and 26 interconnect the associated power and control means.

The spacing between the electrodes is adjusted so that at the applied voltage the maximum potential gradient established in the dielectric represented by the surrounding atmosphere is below the point at which electrical breakdown will occur. The voltage or potential difference employed is not critical and will vary depending upon the size, wall thickness and chemical composition of the mantle and its contents. Potential differences of 800 to 125 kv. are considered to be applicable with suitable adjustment of electrode spacing to avoid dielectric breakdown in the space between the electrodes. It may be considered that air has a dielectric constant of 1.00054 and a dielectric strength of 0.8 kv./mm. in order to arrive at an approximate initial spacing for the value of the voltage employed. The spacing may be then further adjusted or initially determined empirically by the adjustment of the spacing so that at the applied voltage lysis or rupture of the capsular material occurs, but below the point at which electrical breakdown will occur in the intervening air space. In this connection the polar nature of the capsule contents will permit effective operation of the system at lower potential gradients. Polar compounds may therefore be advantageously employed as a capsule nucleus. The degree of polarity of the core material and the physical characteristics of the mantle material results in substantial variation in the electrode spacing and consequent voltage gradient requisite for capsule rupture.

The mechanism by which the micro-capsule ruptures is not completely understood. One may assume a micro-capsule to be generally spherical having the cross-section illustrated on an enlarged scale in FIGURE 4. The capsule designated generally by the numeral 32 comprises a polar liquid core 34 enclosed by a mantle 33. When a capsule of this type is disposed in the electrostatic field established between electrodes 35 and 36 connected to a source 39 through conductors 37 and 38 respectively it would appear that the capsule is subjected to aberration. The field may thus tend to elongate the capsule in a direction parallel to the lines of force to what may be a generally ovate form shown by the broken line 32a. The tendency to change the geometry of the capsule and the volume enclosed thereby would appear to place the bounding surface or mantle under sufficient strain to result in the lysis or rupture thereof thus exposing the capsule contents.

Whereas the arrangement of FIGURE 1 illustrates the manner in which dots or lines may be produced upon the record sheet, the arrangement of FIGURE 2 illustrates the manner in whch a complete symbol such as a letter or numeral may be formed. In ths case an electrode 27 in the shape of the desired symbol is suitably supported as indicated at 27a and connected to a suitable potential source indicated by the numeral 28 through conductor 29. Conductor 30 leads to the base electrode 10 which carries record sheet 11. Application of the voltage source establishes the desired potential gradient to cause rupture of the coating 13 of the capsular material carried by the base sheet 12 in conformity with the symbol configuration.

While I have illustrated and described the presently preferred embodiment of the invention, it will be apparent that various changes and modifications may be made therein without however departing from the basic inventive concept thereof as set forth in the appended claims.

I claim:

1. The method of exposing or releasing the contents of micro-capsular material which comprises applying an electrostatic field in the region of said capsule, said field being of sufficient intensity to rupture the capsule wall.

2. The method of causing lysis in a microcapsule which comprses subjecting a micro-capsule to an electrostatic field effective to produce lysis thereof.

3. The method of exposing or releasing the contents of micro-capsular material which comprises disposing said material in the region of an electrostatic field having potential difference of sufficient magnitude to cause rupture of the capsular walls but below the point at which electrical breakdown occurs within the field.

4. The method of causing the rupture of the mantle of a micro-capsule which comprises disposing said capsule between spaced electrodes, and establishing an electrostatic field of high potential difference between said electrodes said potential difference being of sufficient magnitude to cause rupture of the capsule mantle but below the point at which electrical breakdown of the atmosphere between the electrodes occurs.

5. The method of causing rupture of the wall surrounding micro-capsular material in order to release or expose the contents thereof which comprises interposing the micro-capsular material in an electrostatic field of high potential difference effective to produce rupture of the capsular wall.

6. The method according to claim 5 wherein the potential difference of said field is between 800 volts and 125 kv.

7. The method according to claim 5 wherein the capsule contents comprise a liquid.

8. The method according to claim 5 wherein the capsule contents comprise a polar compound.

9. The method according to claim 5 wherein the capsule wall is formed of a polar substance.

References Cited by the Examiner

UNITED STATES PATENTS

| | | | |
|---|---|---|---|
| 1,843,572 | 2/32 | MacGahan | 346—1 |
| 2,628,881 | 2/53 | Adams | 346—1 |
| 3,004,819 | 10/61 | Anderson | 346—74 |
| 3,012,839 | 12/61 | Epstein et al. | 346—74 |
| 3,023,070 | 2/62 | Benn | 346—74 |
| 3,063,050 | 11/62 | Millis | 346—1 |
| 3,112,151 | 11/63 | Buros | 346—1 |

LEYLAND M. MARTIN, *Primary Examiner.*